Figure 1:
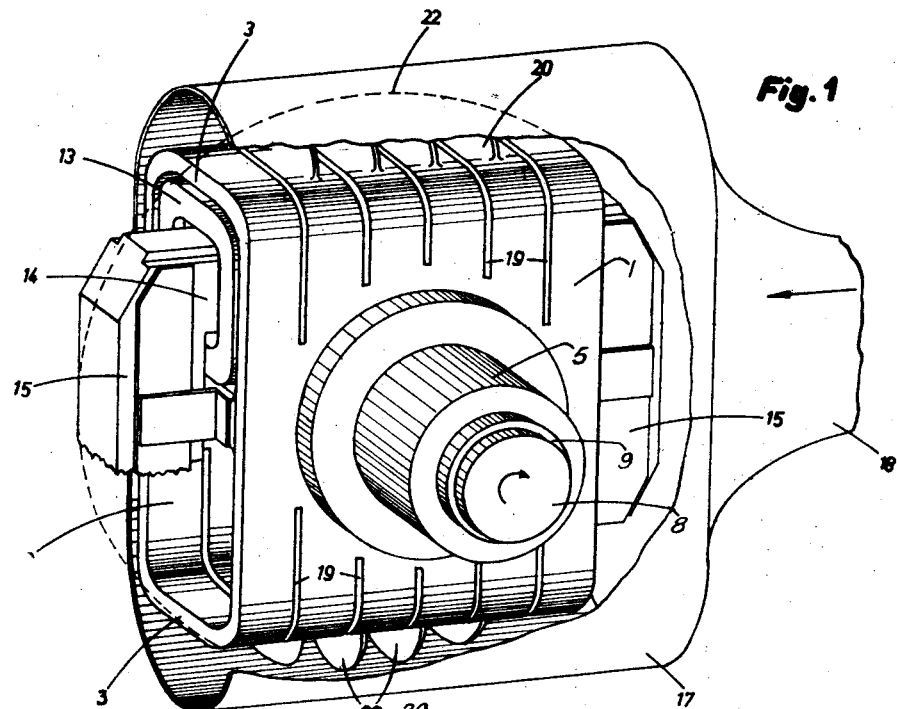

July 29, 1952  A. SCHUTTLER  2,605,376

WELDING TRANSFORMER

Filed Aug. 31, 1949

Inventor:
Artur Schuttler
by

Patented July 29, 1952

2,605,376

UNITED STATES PATENT OFFICE 2,605,376

WELDING TRANSFORMER

Artur Schuttler, Solingen-Ohligs, Germany, assignor to "Kronprinz" Aktiengesellschaft fur Metallindustrie, Solingen-Ohligs, Germany Application August 31, 1949, Serial No. 113,326
In Germany November 5, 1948

19 Claims. (Cl. 219—6)

My present invention relates to a welding transformer, and more particularly to a rotating welding transformer, particularly for pipe welding machines, the secondary of which comprises a rotatably supported hollow body which has two concentrical parts arranged one inside the other and serving as carriers for the electrode discs.

More particularly my invention relates to a rotating welding transformer in which the outer hollow part is arranged on the outside of one wall of the hollow body and the inner part is arranged on the inside of the other wall of the hollow body.

It is an object of my present invention to avoid joints in the hollow body which are flowed through by a current.

It is another object of my present invention to provide for an easy and simple exchange of the primary windings.

It is a further object of my present invention to provide an effective cooling system of the transformer by air on the inside and outside of the hollow body.

It is known to provide rotating welding transformers with a hollow body having supporting axles consisting of two or more parts which are detachably connected with one another by mechanical means. For instance, a hollow body designed as a round casing closed on all sides and enclosing an angular iron core carrying the primary windings is subdivided transversally to its axis of rotation so that one half thereof may be taken off like a lid. This subdivision being necessary partly for reasons of manufacture, partly for the introduction of the iron core and the primary windings, has most detrimental effects from an electrical point of view. The secondary current flows across the subdividing joint through the hollow body, therefore necessitating a good electrical connection between the parts of the body. However, the making of a good electrical contact at the subdivided joint is extremely difficult. It requires not only special means for firmly pressing together the halves of the hollow body, but even at the best design of the subdividing joint, a high resistance of transition remains so that a heavy development of heat is caused at this spot. The consequence thereof is an undesirable high heating of the transformer. Furthermore, the parts of the hollow body can fuse at the subdividing joints.

A further disadvantage is that the occasionally necessary exchange of the primary windings is cumbrous and takes up much time because of the necessary removal of one half of the hollow body, all the more since the bearing of the rotatable hollow body has to be removed on one side.

The present invention avoids these drawbacks, and comprises in its broadest aspect a secondary including a body, a journal, and an axle arranged concentrically to and inside the journal, the hollow body, the journal, and the axle being in direct connection of material. With the expression "being in direct connection of material" I want it to be understood that the parts in question are either made in one piece or consist of several separate pieces which are joined by welding or soldering so that in electrical respect they behave like one piece.

Preferably, two discs are rigidly and conductively connected, respectively, to the journal and the axle so that the discs can act as welding electrodes.

According to a preferred embodiment of my present invention, an iron core and a primary arranged on said core are enclosed by the secondary, the hollow body of which has preferably an open end for introducing the core and the primary.

Preferably, the hollow body has the shape of a tubular section of substantially rectangular cross section having broad and small walls, and the journal is arranged on the outside of one of the broad walls whereas the axle starts at the inner side of the opposite broad wall and protrudes through the journal. The iron surrounds part of the axle, and is provided with a detachable yoke. In one embodiment of the invention the core is rectangular, and has two legs on which two straight coils forming the primary are arranged.

Preferably, the welding transformer according to my present invention is provided with a cooling system comprising a hood surrounding the hollow body and provided with means for directing a flow of cooling air through the hood substantially at right angles to the axis of rotation of the hollow body. Preferably, the hollow body is provided with slots in the walls and ribs arranged on the outside of the walls so that the cooling air flows over the ribs and through the slots into the interior of the hollow body.

It will be understood that the invention avoids the cause for an undesirable production of heat in the transformer by doing away with the joints of the secondary. However, in spite of the secondary being designed as one body the iron core and the primary can be introduced into and withdrawn from the secondary by simply detaching a yoke of the iron core without involving taking the hollow body apart or removing its bearings. Furthermore, the primaries can be designed as straight coils which are arranged on the straight legs of the iron core. The cooling system is designed so that not only the outside of the hollow body, but also its interior and particularly the primaries are effectively cooled.

Figure 2:
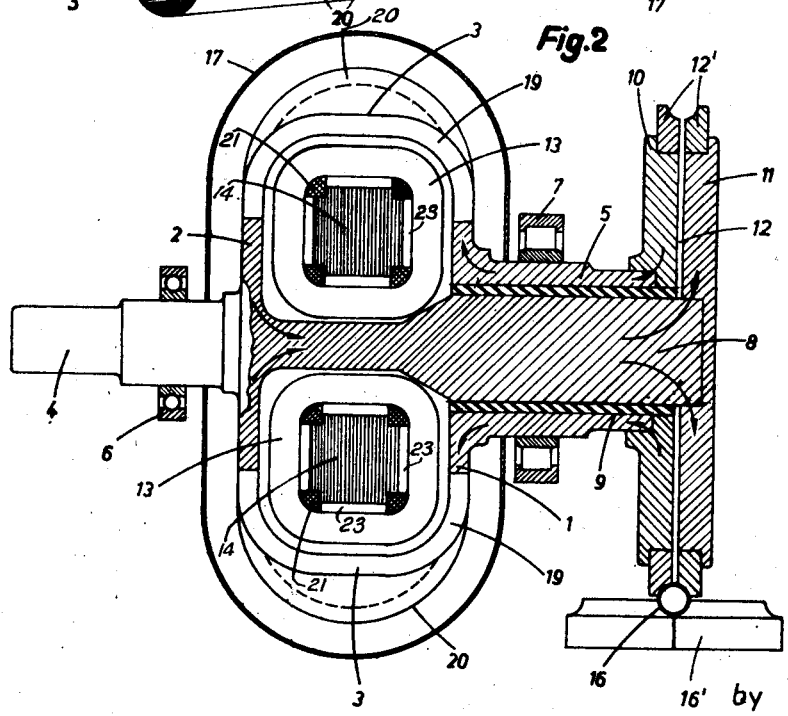

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a perspective view of a welding transformer according to my present invention, the electrode discs being omitted and some parts being broken away; and Fig. 2 is a longitudinal section of the transformer shown in Figure 1, the electrode discs and the article to be welded being shown as well.

The welding transformer shown in the drawing is provided with a hollow body 1, 2, 3, forming the secondary of the transformer and enclosing the primary 13 of the transformer and an iron core 14, 15 carrying the primary. The hollow body is made in one piece and open at two opposite sides thereof. Preferably it has the shape of a tubular section having a substantially rectangular cross section. The broad wall 1 of the hollow body is provided with a hollow journal 5, whereas the broad wall 2 of the hollow body is provided with an axle 4 concentrically arranged to said journal 5. The axle 4 and the journal 5 are running in ball or roller bearings 6 and 7, respectively, the outer faces of which are supported by a stationary member (not shown). The journal 5 surrounds at a certain distance an axle 8 which is connected to and forms one piece with the inner side of the broad wall 2, and passes through the journal 5 and protrudes slightly from the same.

The hollow body 1—3, the journal 5, and the axles 4 and 8 consist of one piece. Therefore, all the walls of the hollow body, the journal and the axles are in a direct connection of material with one another.

The journal 5 and the axle 8 are separated by a cylindrical gap and insulated against each other by a cylindrical sleeve 9 consisting of insulating material and arranged in the gap. The journal 5 and the axle 8 carry, respectively, two circular electrode discs 10 and 11. The disc 10 is attached to the end of the journal 5, and the disc 11 to the end of the axle 8. Both discs are secured to their supporting members in well known manner so that a good electrically conductive connection exists between the discs and the supporting members, respectively. The discs are separated by an air gap 12 and at their circumference provided with contact rings 12' which form together a semicircular recess corresponding to the shape of the pipe 16 the longitudinal seam of which is to be welded. The pipe 16 rests on two rollers 16'.

The primary windings of the transformer are arranged in the form of two substantially square straight coils 13 on the legs 14 of an iron core 14, 15 designed as a substantially rectangular frame surrounding the portion of the axle 8 which is situated inside the hollow body 1—3.

The core is made of transformer sheets which are tightly joined and pressed against one another at the ends of the frame. The two yokes 15 are detachably connected to the legs 14 so that one or the other yoke can be removed. After the removal of one yoke the iron core together with the two coils 13 is introduced into the hollow body 1—3 through one of the side openings and then the removed yoke is replaced in position. If it is intended to exchange the primaries, only one yoke has to be removed whereupon the core and the coils may be withdrawn from the hollow body.

The electric current is supplied to the coils 13 in well known manner by slip rings and sliding contacts (not shown). The current flowing in the coils 13 induces in the hollow body 1—3 a secondary current. The current passes through the walls of the hollow body, the axle 8, the electrode disc 11, the pipe 16, the electrode disc 10, the journal 5, and back through the walls of the rollow body as indicated in Fig. 2 by the arrow.

It will be seen that in the new design of the welding transformer no joint flowed through by a current is present in the hollow body forming the secondary of the transformer. Furthermore, an exchange of the primary windings is easy and simple to perform. Also, the transformer can be effectively cooled by air at its outside and inside.

The cooling of the transformer is effected in the following manner: The transformer is surrounded by a hood 17 which has the shape of a tube with an oblong cross section. One end of the hood 17 is open whereas the other end is provided with a connecting piece 18 serving for connecting a fan to the hood 17. Thus, a flow of cooling air can be made to pass through the hood at right angles to the axis of rotation of the transformer. This air stream flows not only along the outside of the hollow body, but also through its interior, thereby directly contacting the primary and the iron core. In order to enable the air stream to flow along these parts not only in the shown and similar angular positions of the transformer in which the hollow body 1—3 has its openings in the direction of the air flow, but also in other angular positions, the hollow body is provided with a plurality of slots 19 for the access of the cooling air. The slots 19 extend in the direction of the perimeter of the hollow body over its smaller walls 3, and the parts of the broad walls 1 and 2 adjoining thereto. The slots effect an increase in the cooled surface. In order to increase the latter still more cooling ribs 20 are provided in addition to the slots 19.

In the embodiment shown in the drawing, the cooling ribs are arranged on the two smaller walls 3 of the hollow body, and run in the direction of the perimeter of the hollow body and are, therefore, in the angular position of the transformer shown in the drawing and in similar positions at right angles to the direction of flow of the air. Thus the ribs narrow the space between the smaller walls 3 of the transformer and the hood 17 so that the air is compelled partly to flow through the interior of the hollow body. If the transformer has an angular position substantially turned through 90° with respect to that shown in the drawing, the cooling ribs 20 are substantially parallel to the flow of the cooling air and are effectively cooled. In order to enable the cooling air to flow between the primaries and the iron core an air gap 23 surrounding the core practically from all sides is provided, except for the insulating rods 21 arranged at the corners of the cross section of the iron core 14 for carrying the windings of the coils 13.

The operation of this device is as follows: The article to be welded, for instance a pipe 16, is brought into position as shown in Figure 2. The current is then switched in and the transformer produces a welding current in the manner more fully described heretofore. At the same time, the hollow body with the parts connected thereto is rotated, for instance by a belt (not shown), running over the axle 4. The pipe 16 is moved forward by the rotation of the electrode discs 10 and 11 which may be assisted, if desired, by a motion of the pipe of its own. Thus, it will be seen that a seam in the pipe will be welded under the influence of the heat developed by the electric current in the seam of the pipe.

The hollow body 1—3 is preferably made, for instance cast, in such manner that the journal 5 and the axle 8 form at first a common axle. The latter is then provided with a cylindrical gap serving to accommodate the insulating sleeve 9 by means of a cylindrical bit or the like, subdividing the full axle into the journal 5 and the axle 8 surrounded by it.

Various modifications and changes can be made without leaving the scope of the present invention. The iron 14, 15 may consist of a horseshoe-shaped body of metal sheets provided only with one yoke removably secured thereto. The cooling ribs 20 may be arranged at right angles to the direction of the perimeter of the walls of the hollow body so that they are permanently parallel to the direction of the air flow. The axle 4 which is not flowed through by the current can be designed, if desired, as a part separate from the hollow body 1—3, and connected by a screw connection with the hollow body. The ends of the broad walls 1 and 2 of the hollow body may be circular instead of being straight. In any case the hollow body and the iron core 14, 15 carrying the coils 13 are preferably so dimensioned and designed that the edges thereof which are farthest away from the axis of rotation and also the outer edges of the cooling ribs are situated on a circle 22 concentric to the axis of rotation, the circle 22 being indicated by dotted lines in Figure 1. The hollow body 1—3, the journal 5 and the axle 8 may consist of two or more pieces which are welded together and thus in direct connection of material. The transformer may have an iron core with three legs and disc-like coils arranged in slots of the hollow body.

It will be understood that each of the elements described above, or two or more together, may also find a useful application in other types of welding transformers, differing from the types described above.

While I have illustrated and described the invention as embodied in welding transformers particularly for pipe welding machines, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. A rotatable welding transformer comprising in combination, an iron core; a primary arranged on said core; a secondary enclosing said primary and at least part of said core; said secondary including a hollow body having at least one permanently open end for introducing said core and said primary into said hollow body; a journal, and an axle arranged concentrically to and inside said journal; said hollow body, said journal, and said axle being in direct connection of material.

2. A rotatable welding transformer comprising in combination, an iron core; a primary arranged on said core; a secondary enclosing said primary and at least part of said core; said secondary including a hollow body having at least one permanently open end for introducing said core and said primary into said hollow body, a journal, and an axle arranged concentrically to and inside said journal; said hollow body, said journal, and said axle being in direct connection of material; and two discs rigidly and conductively connected, respectively, to said journal and said axle; said discs acting as welding electrodes.

3. A rotatable welding transformer comprising in combination, an iron core; a primary arranged on said core; a secondary enclosing said primary and at least part of said core; said secondary including a hollow body having at least one permanently open end for introducing said core and said primary into said hollow body, a journal, and an axle arranged concentrically to and inside said journal; said hollow body, said journal, and said axle consisting of one piece.

4. A rotatable welding transformer comprising in combination, an iron core; a primary arranged on said core; a secondary enclosing said primary and at least part of said core, said secondary including a hollow body having the shape of a tubular section of substantially rectangular cross section having broad and small walls; said hollow body having permanently open ends for introducing said iron core and said primary into said hollow body; a hollow journal arranged at the outside of one of said broad walls of said body; and an axle arranged concentrically to said journal on the inner side of the other broad wall of said body and protruding through said journal; said hollow body, said journal, and said axle being in direct connection of material.

5. A rotatable welding transformer comprising in combination, a hollow body forming part of the secondary of the transformer and having the shape of a tubular section of substantially rectangular cross section having broad and small walls; said hollow body having permanently open ends; a hollow journal arranged at the outside of one of said broad walls of said body; an axle arranged concentrically to said journal on the inner side of the other broad wall of said body and protruding through said journal; said hollow body, said journal, and said axle being in direct connection of material; a frame-shaped iron core surrounding part of said axle; a detachable yoke forming part of said core; and a primary arranged on said core, whereby said core and said primary can be brought into and out of position through any of said open ends of said hollow body.

6. A rotatable welding transformer comprising in combination, a hollow body forming part of the secondary of the transformer and having the shape of a tubular section of substantially rectangular cross section having broad and small walls; said hollow body having permanently open ends; a hollow journal arranged at the outside of one of said broad walls of said body; an axle arranged concentrically to said journal on the inner side of the other broad wall of said body and protruding through said journal; said hollow body, said journal, and said axle being in direct connection of material; a rectangular iron core surrounding part of said axle and having two legs; a detachable yoke forming part of said core; and two straight coils arranged, respectively, on said legs of said core, whereby said core and said primary can be brought into and out of position through any of said open ends of said hollow body.

7. A rotatable welding transformer comprising in combination, a hollow body having walls; a journal; an axle arranged concentrically to and inside said journal; said hollow body, said journal, and said axle being in direct connection of material and forming a secondary of the transformer; and cooling ribs arranged on the outside of said walls.

8. A rotatable welding transformer comprising in combination, a hollow body having walls; a journal; an axle arranged concentrically to and inside said journal; said hollow body, said journal, and said axle being in direct connection of material and forming a secondary of the transformer; slots in said walls for the access of cooling air; and cooling ribs arranged on the outside of said walls.

9. A rotatable welding transformer comprising in combination, a hollow body having the shape of a tubular section of substantially rectangular cross section having broad and small walls; said hollow body having open ends; a hollow journal arranged at the outside of one of said broad walls of said body; an axle arranged concentrically to said journal on the inner side of the other broad wall of said body and protruding through said journal; said hollow body, said journal, and said axle being in direct connection of material; slots in said small walls and part of said broad walls; and cooling ribs arranged on the outside of small walls.

10. A rotatable welding transformer comprising a secondary including a hollow body, a journal, and an axle arranged concentrically to and inside said journal; said hollow body, said journal, and said axle being in direct connection of material; a hood surrounding said hollow body; and means for directing a flow of cooling air through said hood substantially at right angles to the axis of rotation of said hollow body.

11. A rotatable welding transformer comprising a secondary including a hollow body, a journal, and an axle arranged concentrically to and inside said journal; said hollow body, said journal, and said axle being in direct connection of material; said hollow body having two openings arranged at opposite ends of said body; a hood surrounding said hollow body; and means for directing a flow of cooling air through said hood and substantially at right angles to the axis of rotation of said hollow body.

12. A rotatable welding transformer comprising in combination, a hollow body having the shape of a tubular section of substantially rectangular cross section having broad and small walls; said hollow body having open ends; a hollow journal arranged at the outside of one of said broad walls of said body; an axle arranged concentrically to said journal on the inner side of the other broad wall of said body and protruding through said journal; said hollow body, said journal, and said axle being in direct connection of material, slots in said small walls and part of said broad walls; cooling ribs arranged on the outside of said small walls; a hood surrounding said hollow body; and means for directing a flow of cooling air through said hood substantially at right angles to the axis of rotation of said hollow body.

13. A rotatable welding transformer comprising in combination, a hollow body having the shape of a tubular section of substantially rectangular cross section having broad and small walls; said hollow body having open ends; a hollow journal arranged at the outside of one of said broad walls of said body; an axle arranged concentrically to said journal on the inner side of the other broad wall of said body and protruding through said journal; said hollow body, said journal, and said axle being in direct connection of material; slots in said small walls and part of said broad walls; cooling ribs arranged on the outside of said small walls; said slots and said ribs being arranged in the direction of the perimeter of said hollow body; a hood surrounding said hollow body; and means for directing a flow of cooling air through said hood substantially at right angles to the axis of rotation of said hollow body.

14. A rotatable welding transformer comprising in combination, an iron core; a primary arranged on said core; a secondary enclosing said primary and at least part of said core, said secondary including a hollow body having at least one permanently open end for introducing said core and said primary into said hollow body; a journal; an axle arranged concentrically to and inside said journal, said hollow body, said journal, and said axle being in direct connection of material; and cooling means associated with the walls of said hollow body.

15. A rotatable welding transformer comprising in combination, a hollow body forming part of the secondary of the transformer and having the shape of a tubular section of substantially rectangular cross section having broad and small walls, said hollow body having permanently open ends; a hollow journal arranged at the outside of one of said broad walls of said body; an axle arranged concentrically to said journal on the inner side of the other broad wall of said body and protruding through said journal, said hollow body, said journal, and said axle being in direct connection of material; a rectangular iron core surrounding part of said axle and having two legs; a detachable yoke forming part of said core; two straight coils arranged, respectively, on said legs of said core, whereby said core and said primary can be brought into and out of position through any of said open ends of said hollow body; and cooling means associated with at least the small walls of said hollow body.

16. A rotatable welding transformer comprising in combination, an iron core, a primary arranged on said core; a secondary enclosing said primary and at least part of said core, said secondary including a hollow body having first and second wall portions arranged oppositely to each other and consisting of one piece, said hollow body having at least one permanently open end for introducing said core and said primary into said hollow body; a first welding disc rigidly connected to said first wall portion of said hollow body, said first welding disc being provided with an aperture; an axle arranged concentrically to said aperture of said first welding disc and being in direct connection of material with said second wall portion of said hollow body; and a second welding disc rigidly connected to said axle and arranged parallel to said first welding disc.

17. A rotatable welding transformer comprising in combination, an iron core, a primary arranged on said core; a secondary enclosing said primary and at least part of said core, said secondary including a hollow body having first and second wall portions arranged oppositely to each other and consisting of one piece, said hollow body having at least one permanently open end for introducing said core and said primary into said hollow body, said first wall portion being provided with an aperture; a first welding disc rigidly connected to said first wall portion, said first welding disc being provided with an aperture concentric to said aperture of said first wall portion; an axle arranged concentrically to said apertures of said first wall portion and said first welding disc and being in direct connection of material with said second wall portion of said hollow body; and a second welding disc rigidly connected to said axle and arranged parallel to said first welding disc.

18. A rotatable welding transformer comprising in combination, an iron core, a primary arranged on said core; a secondary enclosing said primary and at least part of said core, said secondary including a hollow body having first and second wall portions arranged oppositely to each other and consisting of one piece, said hollow body having at least one permanently open end for introducing said core and said primary into said hollow body; a first welding disc rigidly connected to said first wall portion of said hollow body, said first welding disc being provided with an aperture; an axle arranged concentrically to said aperture of said first welding disc and consisting of one piece with said second wall portion of said hollow body; and a second welding disc rigidly connected to said axle and arranged parallel to said first welding disc.

19. A rotatable welding transformer comprising in combination, an iron core, a primary arranged on said core; a secondary enclosing said primary and at least part of said core, said secondary including a hollow body having first and second wall portions arranged oppositely to each other and consisting of one piece, said hollow body having at least one permanently open end for introducing said core and said primary into said hollow body, said first wall portion being provided with an aperture; a first welding disc rigidly connected to said first wall portion, said first welding disc being provided with an aperture concentric to said aperture of said first wall portion; an axle arranged concentrically to said apertures of said first wall portion and said first welding disc and consisting of one piece with said second wall portion of said hollow body; and a second welding disc rigidly connected to said axle and arranged parallel to said first welding disc.

ARTUR SCHUTTLER.

REFERENCES CITED

The following references are of record in the file of this patent:

UNITED STATES PATENTS

| Number | Name | Date |
|---|---|---|
| 2,156,692 | Hixon | May 2, 1939 |
| 2,241,015 | Hunter | May 6, 1941 |
| 2,370,485 | Nichols | Feb. 27, 1945 |
| 2,477,607 | Hungate | Aug. 2, 1949 |
| 2,561,739 | Hunter | July 24, 1951 |

FOREIGN PATENTS

| Number | Country | Date |
|---|---|---|
| 265,411 | Italy | June 13, 1929 |